US010460280B2

(12) United States Patent
Lection et al.

(10) Patent No.: US 10,460,280 B2
(45) Date of Patent: Oct. 29, 2019

(54) METHODS AND SYSTEMS FOR MULTIPLE DRONE DELIVERY SYSTEM

(71) Applicant: INTERNATIONAL BUSINESS MACHINES CORPORATION, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 15/290,215

(22) Filed: Oct. 11, 2016

(65) Prior Publication Data

US 2018/0101817 A1    Apr. 12, 2018

(51) Int. Cl.
| | | |
|---|---|---|
| *G06Q 10/08* | (2012.01) | |
| *G05D 1/10* | (2006.01) | |
| *G05D 1/00* | (2006.01) | |
| *B64C 39/02* | (2006.01) | |
| *B64D 47/08* | (2006.01) | |
| *B64D 45/08* | (2006.01) | |

(52) U.S. Cl.
CPC ....... *G06Q 10/0832* (2013.01); *B64C 39/024* (2013.01); *B64D 45/08* (2013.01); *B64D 47/08* (2013.01); *G05D 1/0088* (2013.01); *G05D 1/101* (2013.01); *B64C 2201/128* (2013.01)

(58) Field of Classification Search
CPC .............. G06Q 10/0832; G06Q 10/083; B64C 39/024; B64C 2201/128; B64C 2201/20; B64D 45/08; B64D 47/08; G05D 1/0088; G05D 1/101; G05D 2201/0207; G05D 1/0011; G08G 5/0069
USPC ....................................................... 705/332
See application file for complete search history.

(56) References Cited

U.S. PATENT DOCUMENTS

| | | | |
|---|---|---|---|
| 9,070,101 | B2 | 6/2015 | Abhyanker |
| 10,049,589 | B1* | 8/2018 | Boyd ..................... G08G 5/025 |
| 2014/0032034 | A1 | 1/2014 | Raptopoulos et al. |
| 2014/0316243 | A1* | 10/2014 | Niedermeyer ....... A61B 5/7264 |
| | | | 600/407 |
| 2015/0120094 | A1 | 4/2015 | Kimchi et al. |

(Continued)

OTHER PUBLICATIONS

Eaton, Christopher M; Chong, Edwin K P; Maciejewski, Anthony A, Multiple-Scenario Unmanned Aerial System Control: A systems Engineering Approach and Review of Existing Control Methods, (2016), Aerospace, 3 (Year: 2016).*

(Continued)

*Primary Examiner* — Brian M Epstein
*Assistant Examiner* — Brian Adams Heflin
(74) *Attorney, Agent, or Firm* — Griffiths & Seaton PLLC

(57) ABSTRACT

Embodiments for delivering goods to customers by a processor are described. An item is selected to be delivered to a delivery point. The selected item is loaded onto a first drone. The delivery point is scanned with a second drone. Based on the scanning of the delivery point, the delivery point is determined to be in a first condition or a second condition. If the delivery point is in the first condition, the first drone delivers the selected item to the delivery point.

21 Claims, 7 Drawing Sheets

(56) References Cited

U.S. PATENT DOCUMENTS

2015/0321758 A1* 11/2015 Sarna, II .............. G05D 1/0011
                                                              244/63
2015/0370251 A1    12/2015 Siegel et al.
2019/0101935 A1*   4/2019 Lai ....................... B64C 39/024

OTHER PUBLICATIONS

Anderson, "How I Accidentally Kickstarted the Domestic Drone Boom," Danger Boom Wired.com, http://www.wired.com/dangerroom/2012/06/ff-drones/all, Jun. 22, 2012 (11 pages).

Eames, Jr. et al., "Weather Aware Route Planning (WARP)," 8th AIAA Atmosphere and Space Environments Conference, 2015 (2 pages).

Gallenstein et al., "Autonomous Fixed-Point Landing for Quadrotor Aerial Vehicles," Shanghai University, Jan. 3, 2015 (50 pages).

Green, "Mine Rescue Robots Requirements: Outcomes from an industry workshop," Robotics and Mechatronics Conference, 6th IEEE, 2013 (6 pages).

* cited by examiner

US 10,460,280 B2

METHODS AND SYSTEMS FOR MULTIPLE DRONE DELIVERY SYSTEM

BACKGROUND OF THE INVENTION

Field of the Invention

The present invention relates in general to computing systems, and more particularly, to various embodiments for delivering items using multiple drone delivery systems.

Description of the Related Art

One of the problems expected with the practical implementation of drone (e.g., unmanned aerial vehicle (UAV)) based delivery systems is that the current state of the art drones have limited carrying (or payload) capacity. These drones also have relatively limited ranges.

As a result, ideally the drones are able to transport the product(s) (or item(s)) stored thereon to the delivery point (e.g., a customer address) and deliver it without any delays caused by, for example, the presence of an object, or some other obstruction, in the particular area, or "drop area," where the product is to be left by the drone. Otherwise, the drone may have to return to the warehouse (or another location) before again attempting to deliver the product. Similarly, it may be undesirable for the drone to leave the product in the drop area because of environmental conditions, such as the presence of water, as the product may be damaged.

SUMMARY OF THE INVENTION

Various embodiments for delivering items by a processor are described. In one embodiment, by way of example only, a method for delivering items, again by a processor, is provided. An item is selected to be delivered to a delivery point. The selected item is loaded onto a first drone. The delivery point is scanned with a second drone. Based on the scanning of the delivery point, the delivery point is determined to be in a first condition or a second condition. If the delivery point is in the first condition, the first drone delivers the selected item to the delivery point.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
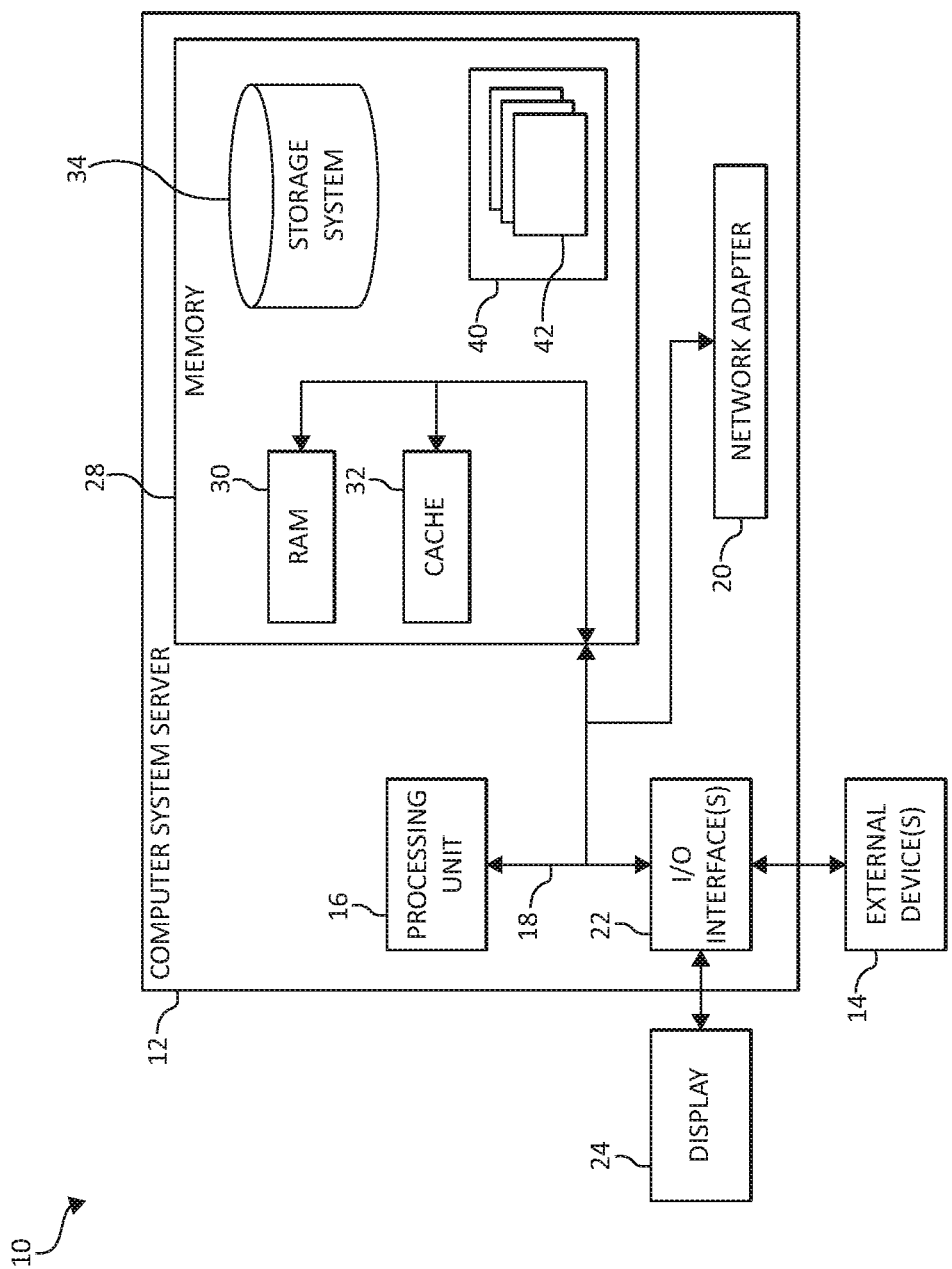
FIG. 1 is a block diagram depicting an exemplary computing node according to an embodiment of the present invention.

As previously indicated, the use of drone based delivery systems is likely to result in undesirable inefficiencies due to undesirable conditions at the delivery point, or a "drop area" (e.g., a particular area at the customer address), such as delivery delays (and/or cancellations) and damaged products or items due to obstructions and environmental conditions at the delivery point.

Consider an example in which the drone is attempting to deliver a product to a particular drop area, such as the back porch at a customer's residence. If an unforeseen object, such as a child's toy or patio furniture, is in the drop area, the drone may not be able to land and/or position itself appropriately to drop the product (i.e., in the event that the product is suitable to be simply dropped). In such an instance, assuming the drone is able to detect the object, it may have to return to the warehouse (or proceed to some other location), and the delivery may have to be attempted at a later time, thus resulting in a delayed delivery and an additional drone flight. Similarly, if the back porch is covered with water (e.g., from rain or sprinklers), if the drone drops the product on the porch, and the product is exposed to the water for some length of time, the product may be damaged.

In view of the foregoing, a need exists for drone based delivery systems in which overall efficiency, such as that related to the detection of the suitability of the delivery points for receiving deliveries, is optimized.

To address these needs, the methods and systems of the present invention use, for example, "scout drones" (e.g., unmanned aerial vehicles (UAVs)) to scan the delivery area(s) to which items (e.g., products) are to be delivered by delivery drones (e.g., UAVs transporting the products). Based on information retrieved during the scanning of the delivery area, a determination is made as to whether or not the delivery area is a condition suitable (or ready) to receive the delivery (i.e., a first condition). If the delivery area is ready to receive the delivery, the delivery drone(s) may carry out the delivery as planned. However, if it is determined that the delivery point is not in a condition suitable to receive the delivery (i.e., a second condition), one or more actions may be taken by the drone and/or the system as a whole. In such an event, depending on the exact condition of the delivery point, the system may, for example, cancel the delivery, reschedule the delivery for another time, determine a secondary delivery point (or drop area), send a message in some form to the customer (e.g., email, text, aural, visual, etc.) indicating the nature of the condition of the delivery point, or another suitable response. After the condition of the delivery point is rectified (and perhaps re-scanned by a scout drone verifying such), the product(s) may be delivered to the delivery point (e.g., by a delivery drone).

In some embodiments, rather than "scouting" all delivery points with a particular region, the system selects particular delivery points to be scouted based on various factors. These factors may include, for example, the distance between the origination point (e.g., for the delivery drone) and the delivery point, previous delivery history, the size of the delivery area (or drop area), characteristics of the delivery area, whether or not other deliveries have recently been made to the delivery point, and environmental conditions (e.g., weather).

The scout drones may be launched (or originate) from the same location as the delivery drones (e.g., a warehouse or delivery vehicle). However, in some embodiments, the scout drones are launched from, for example, a dedicated location (e.g., a vehicle different than the delivery vehicle), a larger scout drone (e.g., a scout drone "mother ship"), and/or from one of the delivery drones.

The scout drones may be smaller and/or more efficient (e.g., have a greater range and/or maximum flight time) than the delivery drones. However, in some embodiments, the scout drones are identical, or substantially identical, to the delivery drones, but are only used to check the condition of the delivery points before the deliveries are made by the delivery drones. In some embodiments, some, or all, of the scout drones are identical, or substantially identical. However, the scout drones may be different and have unique capabilities/functionalities.

The scout drones may be equipped with video imaging and image processing devices or other sensors such as lasers, infrared sensors, radar, etc., to, for example, identify objects (or obstructions, debris, etc.) in the delivery area and/or identify a specific drop (or landing) zone, such as a uniquely marked box, a pattern formed on the ground (e.g., on a mat). In some embodiments, the scout drones are equipped to take a photograph (and/or video) of the delivery area and relay it to be sent to, for example, the customer to inform them of the issue(s) with the delivery area. The scout drones may also be equipped with sensors capable of detecting various environmental conditions, such as water, snow, etc. on the delivery area and/or the weather. Further, the scout drones may be equipped with communication equipment that allows the drones (and/or the system as a whole) to communicate with automation systems at the delivery point (e.g., to enable or disable an alarm, if necessary). In some embodiments, the scout drones may be equipped with devices suitable for generating aural and/or visual messages (e.g., speakers, lights, display devices, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in a warehouse or a drone (e.g., UAV). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
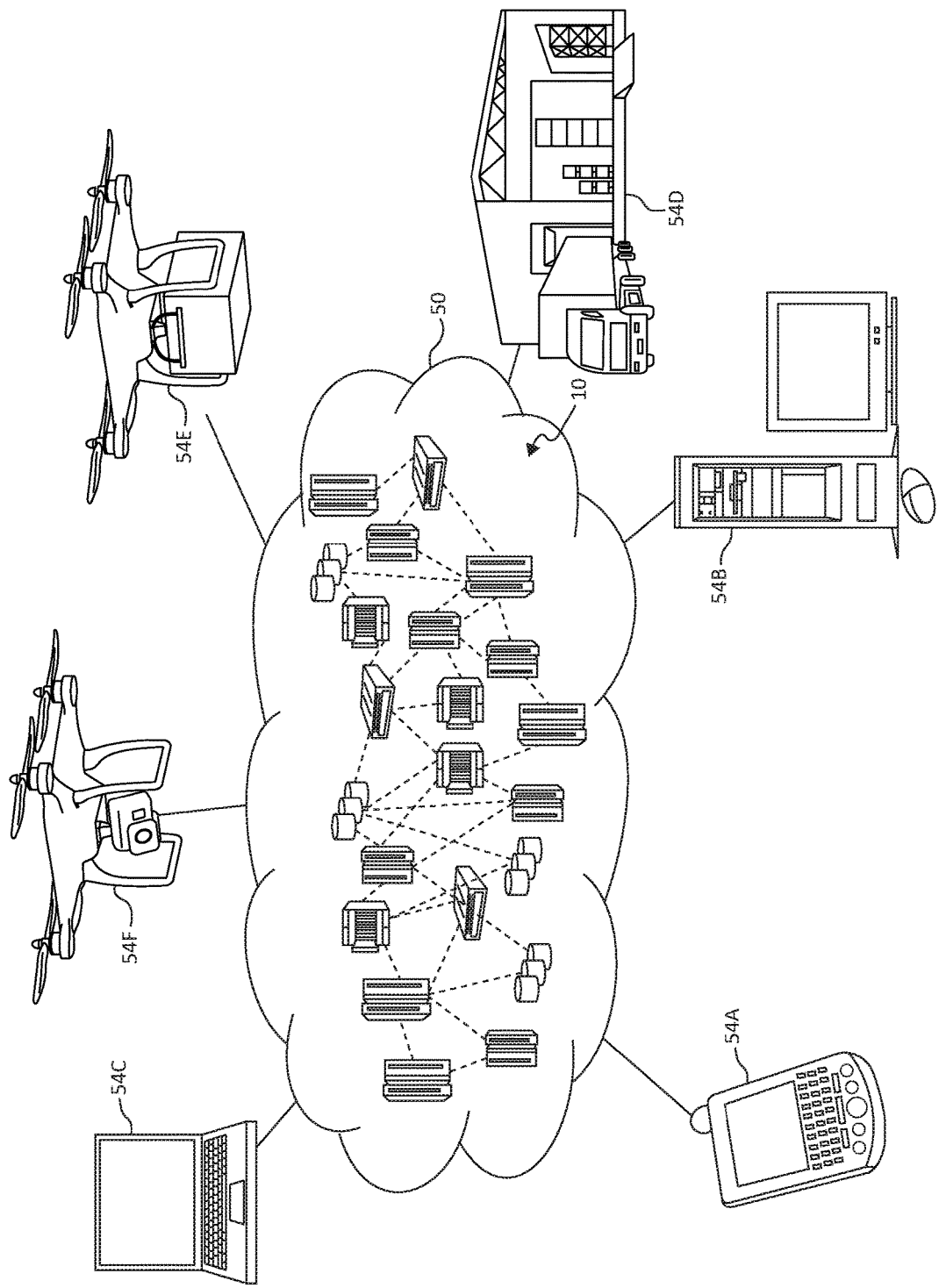
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and delivery computer systems, such as, for example, those in delivery vehicles and/or warehouse(s) (or origination points for deliveries) 54D, delivery drones 54E, and/or scout drones 54F, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-F shown in FIG. 2 are intended to be illustrative only and that computing nodes 10 and cloud computing environment 50 can communicate with any type of computerized device over any type of network and/or network addressable connection (e.g., using a web browser).

Figure 3:
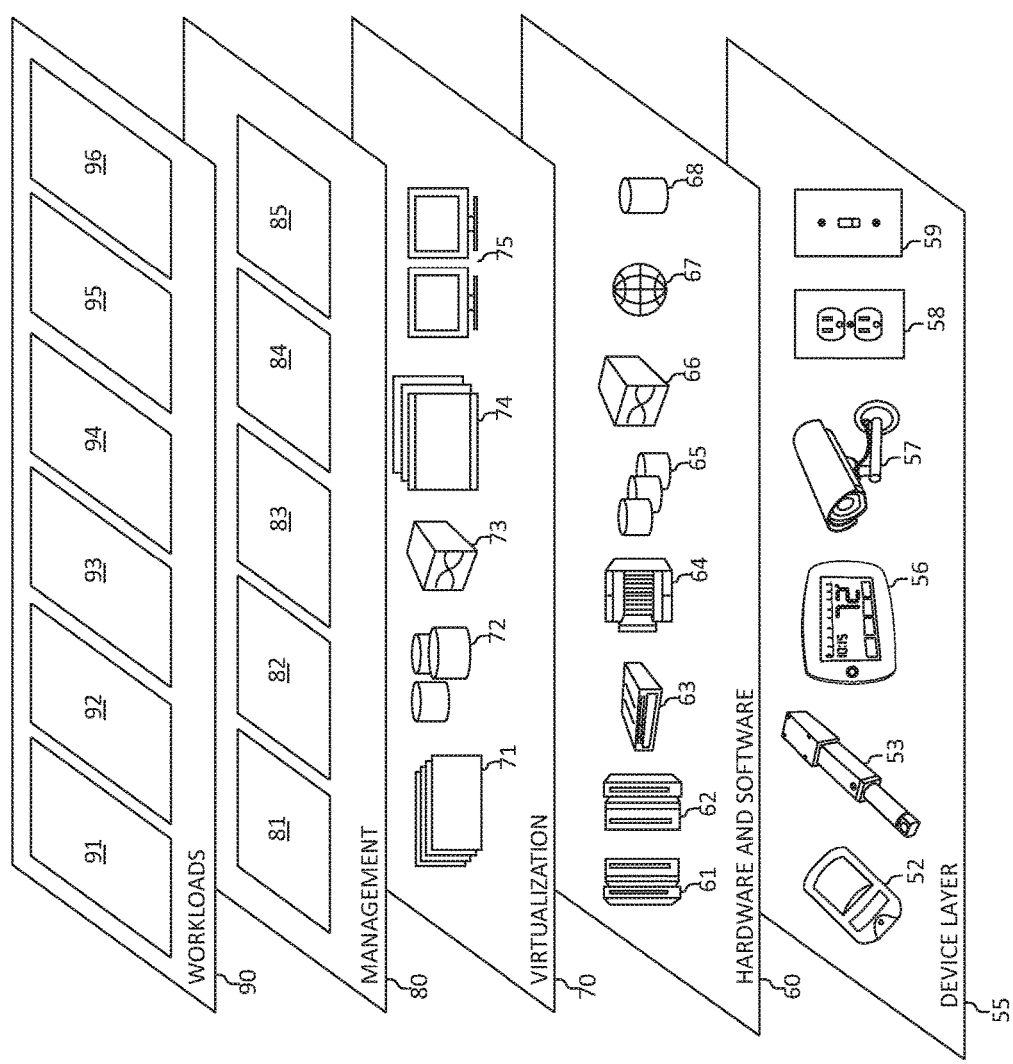
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones, delivery vehicles, and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones while scouting delivery point and making deliveries. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for delivering items (e.g., delivering products to customers). The methods and systems include a data collection aspect, where a variety of information (i.e., customer-associated information) may be collected about customers (and/or potential customers) in, for example, a particular geographic region after orders for products have been received. The information may include a delivery point (e.g., a delivery address) for each customer who has placed an order for a product that is to be delivered using the methods and systems described herein. Additionally, the information may include, for example, the current date/season and weather data (e.g., temperature, chance of participation, etc.) associated with the region(s) in which the deliveries are to take place. In some embodiments, the system(s) described herein control the drones in the manner(s) described below and/or otherwise enable or cause the various functionalities described to be performed.

After one or more customer orders is received (e.g., by the customer placing the order via the Internet on a PDA, cellular telephone, desktop computer, etc.), the products (or items or goods) are loaded onto delivery drones. In some embodiments, each product is loaded onto a respective drone. However, it should be understood that, depending on the size and weight of the products, multiple products may be loaded onto a single delivery drone when suitable (e.g., a single customer has placed an order for multiple relatively small, light products). The products may be loaded onto the drones at a first location, such as a warehouse or delivery vehicle where the products are stored.

Figure 4:
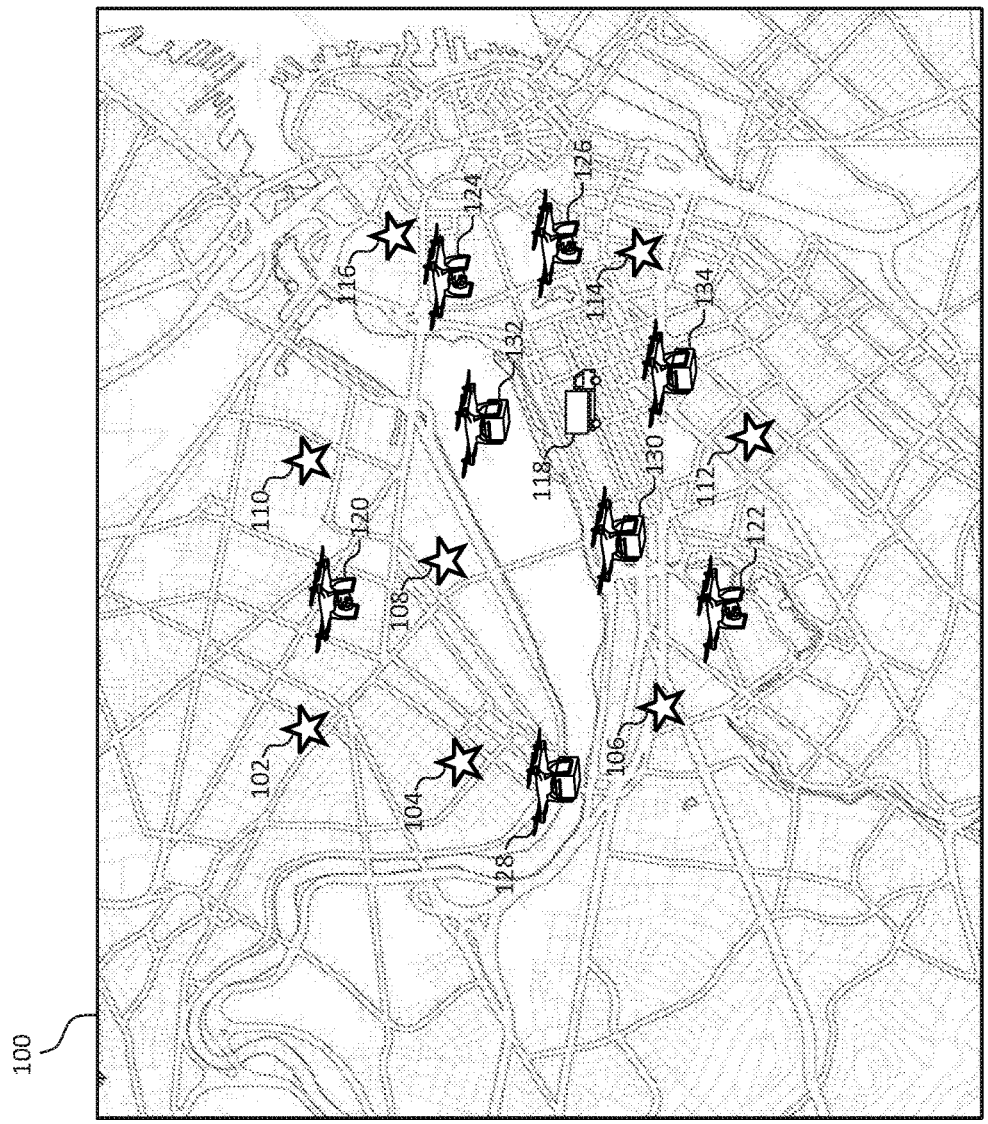
FIG. 4 is a plan view of a map having delivery points, drones, and an origination point for the drones indicated thereon in accordance with aspects of the present invention.

Referring to FIG. 4, a map 100 of a particular geographic region is shown. On the map 100, locations of various components used in the methods and systems described herein are shown, including delivery points 102-116, a vehicle 118, scout drones 120-126, and delivery drones 128-134.

Each of the delivery points 102-116 may be associated with an order that has been received for one more products. For example, each of the delivery points 102-116 may be at a customer address (e.g., residence or business address) for a respective order. However, it should be understood that the delivery points 102-116 may not be associated with customer orders per se. Rather, the delivery points 102-116 may simply indicate the locations to which various products (or items) are to be delivered, regardless of any business transaction taking place (e.g., the shipping of an item, such as a gift, from one person to another).

In the example shown in FIG. 4, the vehicle 118 is positioned at a location that is essentially at the center of the group of delivery points 102-116. However, the vehicle 118 may be positioned differently depending on, for example, the distribution of the delivery points 102-116. In some embodiments, the vehicle 118 is used as an origination point (or base) for at least some of the scout drones 120-126 and/or the delivery drones 128-134. During the delivery processes described herein, the vehicle 118 may move to, for example, optimize overall efficiency. In some embodiments, the vehicle 118 is a ground vehicle (e.g., a driverless truck). However, the vehicle 118 may also be a relative large drone capable of storing or housing at least some of the scout drones 120-126 and/or the delivery drones 128-134. Alternatively, the location of the vehicle 118 may simply refer to a location at which at least some of the scout drones 120-126 and/or the delivery drones 128-134 attach to each other to optimize power usage and/or extend the range of the individual drone. It should also be noted that in some embodiments the vehicle 118 may be replaced by, or used in conjunction with, a stationary warehouse or some other origination point for the drones (e.g., the location of the vehicle 118 shown on the map 100 may simply refer to the location of a warehouse).

In the depicted embodiment, eight delivery points 102-116, four scout drones 120-126, and four delivery drones 128-134 are shown. However, it should be understood that these numbers are simply meant to provide an example and/or represent the system during a particular point of operation, as the numbers of the delivery points, scout drones, and delivery drones may vary. For example, the number of delivery drones 128-134 may be greater than the number of scout drones 120-126 (e.g., additional drones may be stored on the vehicle 118).

In at least some embodiments, as described in greater detail below, after a customer order is received (or the delivery of an item to a delivery point is otherwise scheduled), one of the scout drones 120-126 travels to and scans the appropriate delivery point 102-116 (and/or a particular area at the delivery point) using, for example, video imaging equipment, infrared sensors, lasers, etc. Based on the data retrieved during the scanning of the delivery point, a determination is made as to whether or not the delivery point is in a condition suitable for (or ready for) the delivery to take place (e.g., the delivery point is in a first condition).

However, it should be noted that in some embodiments, not all of the delivery points 102-116 are scanned (or "scouted") by the scout drones 120-126, as may be the case when the number of delivery points 102-116 within a particular region (and/or the number of deliveries within the region scheduled to occur at approximately the same time) is greater than the number of scout drones 120-126 available within that region. As such, in some embodiments, only particular delivery points 102-116 may be scheduled to be scouted before those deliveries are to take place.

The selection of the delivery points 102-116 that are to be scouted may be based on, for example, the distance between the origination point of the delivery (e.g., the vehicle 118) and the particular delivery point. In some embodiments, only the delivery points that are relatively close to the origination point (e.g., delivery points 106, 108, 112, and 114) are scouted to, for example, minimize the amount of power (or fuel) used by the scout drones 120-126. Alternatively, only the delivery points that are relatively far from the origination point (e.g., delivery points 102, 104, 110, and 116) are scouted to, for example, minimize the possibility that one of delivery drones 128-134 travels a long distance, only to be unable to deliver the product(s) stored thereon.

The previous delivery history (i.e., based on previous deliveries) associated with the delivery points 102-116 may also be used to determine which of the delivery points 102-116 are to be scouted. For example, delivery points at which a relatively high percentage of previous deliveries were successfully completed may be less likely to be scouted, and vice versa.

As another example, various characteristics of the delivery points 102-116 may be used to prioritize the scouting of the delivery points 102-116. For example, a delivery point at which the delivery area is a large patio with a significant amount of open space may have a lower priority than a delivery point with a delivery area that is a second story deck with furniture on it (i.e., the size of the delivery areas and/or the known presence of possible objects in the delivery areas may be used). Other exemplary characteristics that may be used include the type of delivery area (e.g., an open space on the ground vs. a delivery box that needs to be opened prior to delivery), the presence of trees, power lines, etc. near the delivery areas, or any other characteristics that may increase the difficulty of completing the delivery.

Whether or not other deliveries were recently made to the delivery points 102-116 may also be used to prioritize the scouting of the delivery points 102-116. For example, if it known that a delivery was made to a particular delivery point earlier that same day (perhaps by another carrier/company), that delivery point may be given a relatively high priority to determine whether or not the previously delivered product(s) is (still) in the delivery area.

Environmental conditions may also be used to prioritize the scouting of the delivery points 102-116. For example, if a particular delivery point is relatively low to the ground (or on the ground itself) and that region had recently experienced a significant amount of rainfall, that delivery point may be given a relatively high priority to check if the delivery area is covered with water. Similarly, if the region in which any of delivery points are located have recently received snowfall, those delivery points may be given a relatively high priority, as may delivery points with a significant amount of nearby foliage (e.g., trees, etc.) that have recently experienced strong winds (e.g., to check for downed branches and/or other debris).

Still referring to FIG. 4, as mentioned above, after a delivery to a delivery point has been scheduled (and assuming that delivery point is scheduled to be scouted), one of the scout drones 120-126 travels to and scans the appropriate delivery point 102-116 (and/or a particular area at the delivery point) using, for example, video imaging equipment, infrared sensors, lasers, etc. Based on the data retrieved during the scanning of the delivery point, a determination is made as to whether or not the delivery point is in a condition suitable for (or ready for) the delivery to take place (e.g., the delivery point is in a first condition). For example, if the scanning of the delivery point indicates that no unwanted objects are present in the particular area of the delivery point where the product is to be unloaded (e.g., the delivery area or drop area) and/or there are no environmental conditions present at the delivery point that could damage the product(s), the delivery point may be determined to be ready for the delivery. In such instances, the appropriate delivery drone 128-134 may then deliver the product as scheduled.

However, if the scanning of the delivery point indicates that the delivery point is not in a condition suitable for delivery to take place (e.g., the delivery point is in a second condition), the delivery may be, for example, cancelled, delayed/rescheduled, or some other action may be taken. For example, if the scanning of the delivery point indicates the presence of an object (e.g., a toy, patio furniture, etc.) in the delivery area and/or the delivery area is covered in water, the delivery point may be determined to be unsuitable (or not ready) for delivery.

Figure 5:
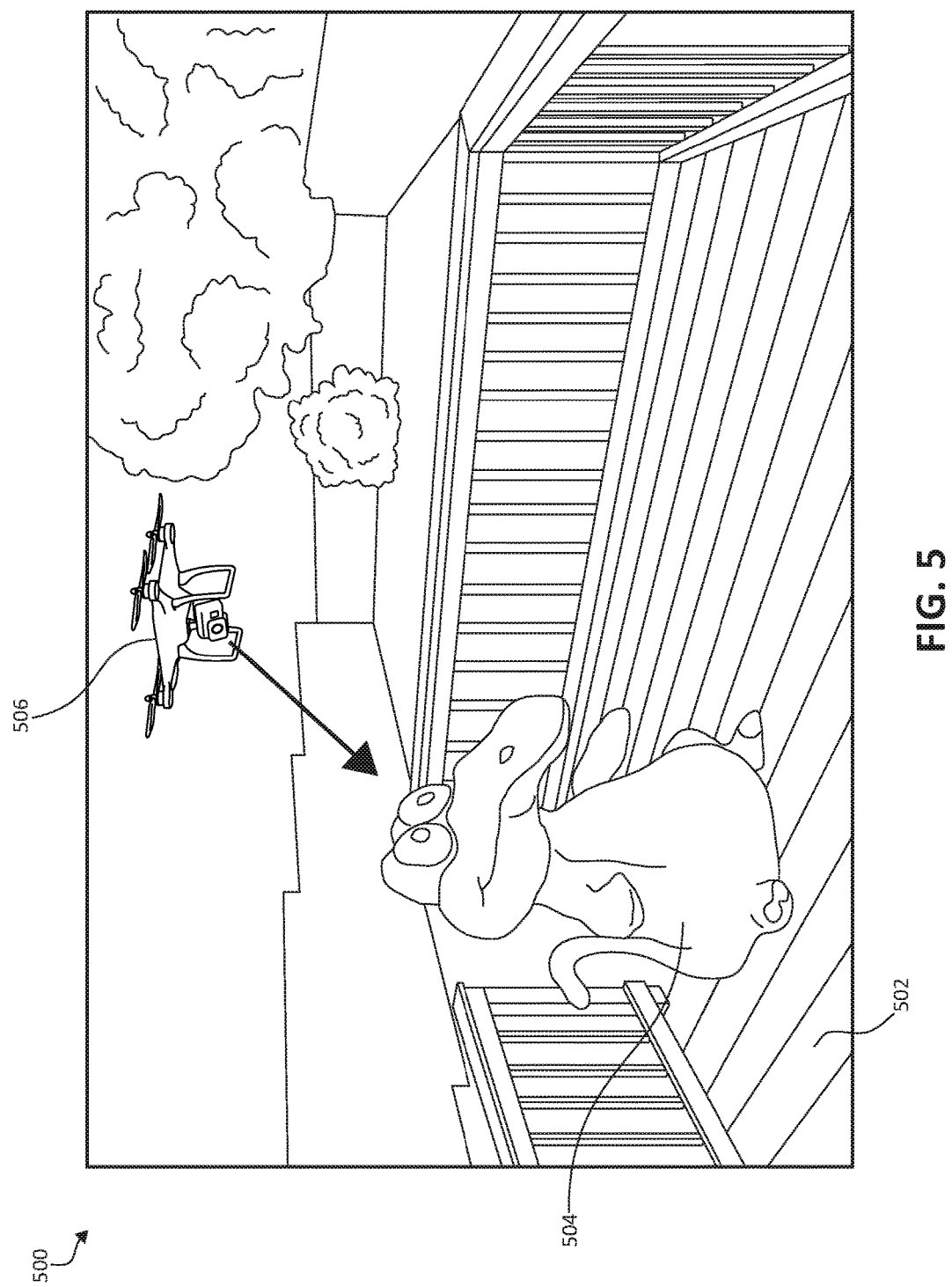
FIG. 5 is a perspective view of a delivery point while being scanned with a drone in accordance with aspects of the present invention.

Referring now to FIG. 5, an exemplary delivery point 500 is shown. In the depicted embodiment, the delivery point 500 is the backyard of a residence. The delivery point 500 includes a delivery area (or landing area or drop area) 502, which in this case is a porch or patio. As shown, an object (e.g., a toy) 504 is present in the delivery area 502. It should be understood that the delivery area 502 may be any particular area at, in, or near the delivery point 500 that is suitable for a delivery drone to delivery or drop the product(s) being delivered. For example, in the delivery point 500 shown in FIG. 5, the delivery area 502 could instead be a portion of the lawn shown behind the patio.

As described above, in some embodiments, before a delivery drone attempts to make delivery at the delivery point 500, a scout drone 506 travels to and scans the delivery point 500 and/or more particularly, the scout drone scans the delivery area 502 (e.g., using video imaging equipment, lasers, radar, etc.). In this case, the scout drone 506 (and/or the scanning of the delivery area 502 by the scout drone 506) detects the presence of the object 504 in (or on) the delivery area 502. As a result, the delivery point 500 (and/or more particularly, the delivery area 502) may be deemed to be in a condition that is not suitable for the delivery to be made (e.g., because the object is blocking the delivery area 502). However, it should be understood that the mere presence of an object within the delivery area 502 may not necessarily result in the delivery point 500 being deemed to be unsuitable for delivery. For example, if the object within the delivery area 502 is relatively small, the system may determine that the presence of the object will not hinder delivery. In such an instance, the system may allow the delivery to proceed.

It should also be noted that delivery area 502 may be a particular portion of a structure or landmark, and the presence of objects (or other obstructions) on the other portions of the structure or landmark may not hinder the delivery of the product(s). For example, at the delivery point 500 shown in FIG. 5, the delivery area 502 may correspond to only the left side (as seen in FIG. 5) of the patio. As such, the presence of some other object (e.g., patio furniture) on the right side of the patio may not cause the delivery point 500 to be deemed unsuitable (or not ready) for delivery.

After the delivery point 500 has been determined to be unsuitable for delivery, one or more of several steps may be taken. For example, the delivery of the product(s) may be simply rescheduled for a later time, or even cancelled altogether. In some embodiments, a secondary (or back-up) delivery area is chosen, if possible. For example, in the delivery point 500 shown in FIG. 5, if the object 504 is blocking the delivery area 502 on the patio (and/or there is another issue with the delivery area 502), the system may determine that it would be acceptable to deliver the product(s) on the lawn behind the patio (or perhaps in front of the residence, such as on the driveway).

In some examples, the system generates a message that is somehow communicated to the customer. For example, an electronic message, such as an email or text message, may be sent to the customer (i.e., using information about the customer associated with the order), which indicates that there is a problem with the delivery area and requests that the problem be resolved (perhaps within a predetermined amount of time) before the delivery drone arrives at the delivery point. In embodiments in which the scout drone 506 is equipped with video imaging equipment, the scout drone 506 may take a photograph (and/or a video) of the delivery area 502, which may be included with the electronic message so that the customer is made aware of the exact nature of the problem (e.g., a photograph of the patio showing the object 504). Also, the scout drone 506 (and/or the delivery drone that will deliver the product) may be equipped with devices to generate aural and/or visual messages or alerts (e.g., speakers, flashing lights, display devices, etc.). In such instances, the scout drone 506 may remain at the delivery point 500 until the problem is resolved or may travel to a different delivery point before returning to the delivery point with the problem to re-check the status of the delivery area (e.g., to determine whether or not the object 504 has been moved). As such, it should be noted that in at least some embodiments, a single scout drone may scout/scan multiple delivery points during one flight/trip before returning to its origination point.

In some embodiments, in the event that the scout drone 506 detects the presence of an undesirable environmental condition, the delivery of the product(s) may simply be delayed. For example, if the scout drone 506 detects the presence of water on the delivery area 502, the delivery of the product(s) may be delayed (or rescheduled) for a later time (e.g., an hour) to allow time for the water to evaporate (and/or to allow time for the customer to somehow remove the water from the delivery area 502).

Although not shown in FIG. 5, in some embodiments, the delivery point 500 includes an assigned delivery box (or container) which is used as the delivery area. Such a delivery box may require some form of preparation before the delivery takes place. For example, the delivery box may have a lid (or top) that needs to be opened or removed before the delivery takes place. In such an instance, the scout drone 506 may detect that the lid of the delivery box has not yet been opened, and a message (or some other indication) may be provided to the customer to alert (or remind) them to do so before the delivery drone arrives. Alternatively, the delivery box may be automated, and in such an instance, the scout drone 506 may determine that the lid of the box has not yet been opened and provide a signal to the system indicating such (i.e., to cause the delivery box to be opened automatically). As such, it should be understood that the systems described herein may be able to rectify some problems/issues at the delivery point 500 without the assistance of the customer (and/or any other individual). It should also be noted that in some cases it may be feasible for the scout drone 506 to move, or push, objects and/or debris from the delivery area 502 (e.g., a small object or a ball) before the delivery takes place.

Figure 6:
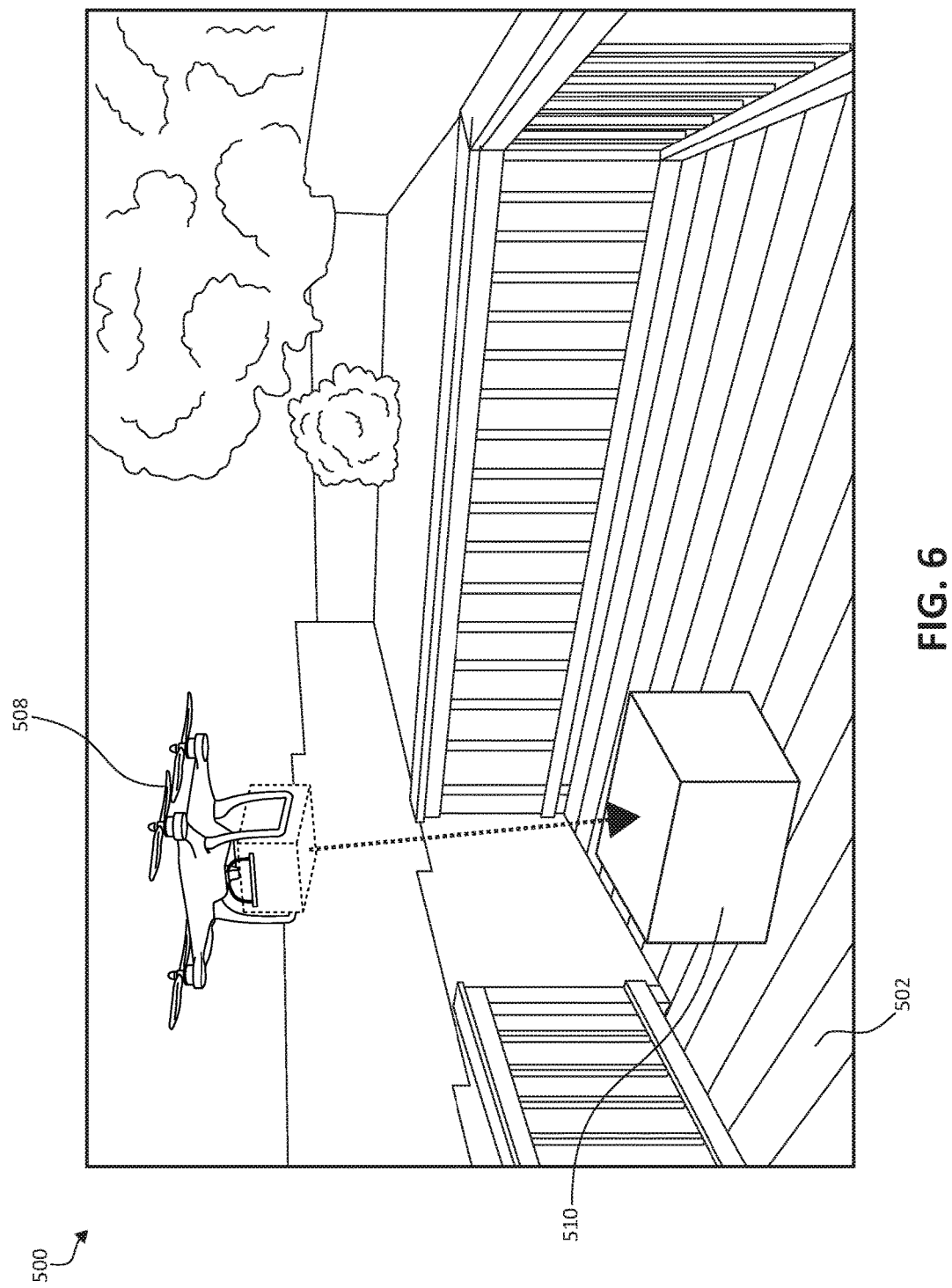
FIG. 6 is a perspective view of a delivery point while an item is delivered thereto with a drone in accordance with aspects of the present invention.

Referring to FIG. 6, in the example shown, after the object 504 has been removed from the delivery area 502 and/or the delivery point has otherwise been made suitable for delivery (or in the event that the initial scan by the scout drone 506 indicated that the delivery point 500 was already suitable for delivery), a delivery drone 508 may then deliver the product(s) 510 to the delivery area 502. In some embodiments, the delivery drone 508 simply hovers over the delivery area 502 at an appropriate altitude (e.g., a few feet) and drops the product(s) 510 onto the delivery area 502. However, in some embodiments, the delivery drone 508 lands in (or on) the delivery area 502 and releases the product(s) 510. After delivering the product 510, the delivery drone 508 may return to the warehouse from which it originated or travel to another location where it is stored and/or retrieved.

Figures 7, 8:
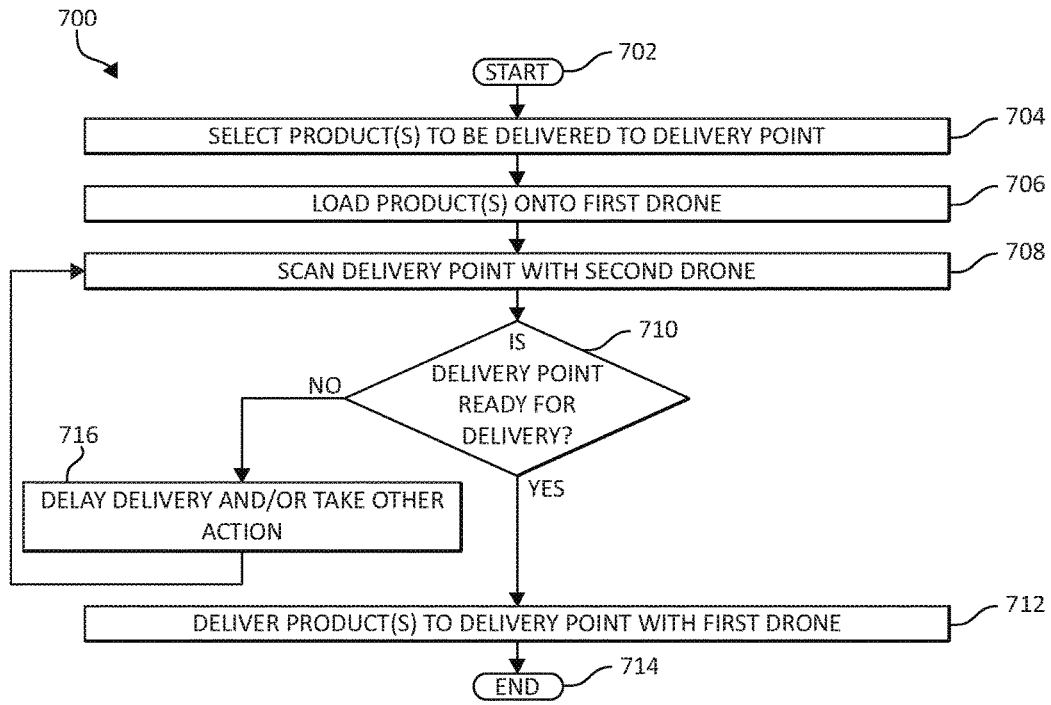
FIG. 7 is a flowchart diagram depicting an exemplary method for delivering items in which various aspects of the present invention may be implemented.
FIG. 8 is a flowchart diagram depicting an exemplary method for delivering goods to customers, again in which various aspects of the present invention may be implemented.

Turning to FIG. 7, a flowchart diagram of an exemplary method 700 for delivering items (e.g., delivering products to customers), in accordance with various aspects of the present invention, is illustrated. Method 700 begins (step 702) with, for example, a customer order (or multiple customer orders) for a product (or products) being received and/or processed. The product(s) associated with the customer order(s) are then selected to be delivered to a delivery point associated with the order (step 704). Alternatively, the products (or items) selected to be delivered may be based on non-business transactions (e.g., a gift being sent from one person to another). The selected product is then loaded onto a first drone (e.g., a delivery drone) (step 706). As described above, the product may be loaded onto the first drone at, for example, a warehouse or a vehicle.

The delivery point (and/or a delivery area or drop zone at the delivery point) is then scanned by a second drone (e.g., a scout drone) (step 708). As described above, the second drone may be equipped with various devices, such as video imaging equipment, lasers, etc., that are used to scan the delivery point, and the second drone may originate from, for example, a warehouse or vehicle (e.g., the same or different location as the first drone).

Information gathered from the scanning of the delivery point by the second drone is then used to determine whether or not the delivery point is in a condition suitable (and/or ready) for the delivery to take place (i.e., whether or not the delivery point is in a first condition) (step 710). If the delivery point is ready for the delivery, the product(s) is delivered to the delivery point by the first drone (step 712), and method ends (step 714) with, for example, the first drone (and/or the second drone) returning to its origination point or traveling to another location.

However, if the delivery point is not ready for the delivery (i.e., is in a second condition), as determined based on the scanning of the delivery point by the second drone (step 710), the delivery of the product(s) is delayed and/or some other action is taken (step 716). As described above, other possible actions taken by the system may include, for example, cancelling the delivery, determining a secondary delivery point (or delivery area within the delivery point), and/or sending a message (e.g., electronic, aural, visual, etc.) to the customer. In the embodiment shown in FIG. 7, after the delivery is delayed and/or some other action is taken, the delivery point is again scanned with the second drone (or another drone) (step 708) and the method 700 repeats as described above.

Although not shown in FIG. 7, it should be understood that the steps described above may be performed in an order different than that shown/described. For example, the product(s) may be loaded onto the first drone after the second drone scans the delivery point and/or the condition of the delivery point is determined. Further, the method 700 may include additional steps (e.g., determining whether or not a particular delivery point is going to be scanned, as described above) or fewer steps (as described in greater detail below with respect to FIG. 8). For example, in some embodiments, the delivery point is not re-scanned/scouted a second time (step 708) after the delivery is delayed and/or some other action is taken (step 716) (i.e., method 700 proceeds to step 712 immediately after step 716).

Turning to FIG. 8, a flowchart diagram of an exemplary method 800 for delivering products to customers, in accordance with various aspects of the present invention, is illustrated. Method 800 begins (step 802) with, for example, a customer order for a product(s) being received and/or processed, or a product(s) or item, being otherwise scheduled to be delivered to a delivery point using a drone.

The delivery point is scanned with a scout drone (step 804) in the manner(s) described above. If the delivery point is determined to be ready for delivery (i.e., in a first condition) (step 806), the product(s) are delivered to the delivery point using a delivery drone (step 808). The method 800 then ends (step 810) with, for example, the delivery drone (and/or the scout drone) returning to its origination point or traveling to another location.

However, if the delivery point is determined to be in a condition not suitable for delivery (i.e., in a second condition), the delivery is delayed or cancelled (step 812). The method 800 then ends (step 810) with, for example, the delivery drone (and/or the scout drone) returning to its origination point or traveling to another location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for delivering items, comprising:
    selecting an item to be delivered to a delivery point;
    causing the selected item to be loaded onto a first drone;
    controlling a second drone to scan the delivery point when a plurality of factors are satisfied such that the second drone is not deployed until a threshold associated with each of the plurality of factors is met; wherein the factors include at least a distance between an originating point and the delivery point of the item, a previous delivery history to the delivery point, a size of the delivery point, and environmental conditions associated with inclement weather at an expected time of delivery of the item;
    based on the scanning of the delivery point, determining if the delivery point is in a first condition or a second condition; and
    if the delivery point is in the first condition, controlling the first drone to deliver the selected item to the delivery point.

2. The method of claim 1, wherein the first condition is indicative of the delivery point being in a condition suitable to receive the selected item, and the second condition is indicative of at least one of an obstruction at the delivery point or the environmental conditions at the delivery point.

3. The method of claim 2, further including if the delivery point is in the second condition, cancelling or delaying said delivery of the selected item to the delivery point.

4. The method of claim 2, further including if the delivery point is in the second condition, determining an alternative delivery point for the selected item.

5. The method of claim 2, further including if the delivery point is in the second condition, causing a message to be generated, wherein the message is indicative of the delivery point being in the second condition and includes at least one of an electronic message or an aural message.

6. The method of claim 2, further including if the delivery point is in the second condition, and the second condition is indicative of an obstruction at the delivery point:
   causing the obstruction to be moved; and
   controlling the first drone to deliver the selected item to the delivery point after said moving of the obstruction.

7. The method of claim 1, wherein at least one of the first drone or the second drone is an unmanned aerial vehicle (UAV).

8. A system for delivering items, comprising:
   a processor that
      selects an item to be delivered to a delivery point;
      causes the selected item to be loaded onto a first drone;
      controls a second drone to scan the delivery point when a plurality of factors are satisfied such that the second drone is not deployed until a threshold associated with each of the plurality of factors is met; wherein the factors include at least a distance between an originating point and the delivery point of the item, a previous delivery history to the delivery point, a size of the delivery point, and environmental conditions associated with inclement weather at an expected time of delivery of the item;
      based on the scanning of the delivery point, determines if the delivery point is in a first condition or a second condition; and
      if the delivery point is in the first condition, controls the first drone to deliver the selected item to the delivery point.

9. The system of claim 8, wherein the first condition is indicative of the delivery point being in a condition suitable to receive the selected item, and the second condition is indicative of at least one of an obstruction at the delivery point or the environmental conditions at the delivery point.

10. The system of claim 9, wherein the processor, if the delivery point is in the second condition, cancels or delays said delivery of the selected item to the delivery point.

11. The system of claim 9, wherein the processor, if the delivery point is in the second condition, determines an alternative delivery point for the selected item.

12. The system of claim 9, wherein the processor, if the delivery point is in the second condition, causes a message to be generated, wherein the message is indicative of the delivery point being in the second condition and includes at least one of an electronic message or an aural message.

13. The system of claim 9, wherein the processor, if the delivery point is in the second condition, and the second condition is indicative of an obstruction at the delivery point:
   causes the obstruction to be moved; and
   controls the first drone to deliver the selected item to the delivery point after said moving of the obstruction.

14. The system of claim 8, wherein at least one of the first drone or the second drone is an unmanned aerial vehicle (UAV).

15. A computer program product for delivering items by a processor, the computer program product comprising a non-transitory computer-readable storage medium having computer-readable program code portions stored therein, the computer-readable program code portions comprising:
   an executable portion that selects an item to be delivered to a delivery point;
   an executable portion that causes the selected item to be loaded onto a first drone;
   an executable portion that controls a second drone to scan the delivery point when a plurality of factors are satisfied such that the second drone is not deployed until a threshold associated with each of the plurality of factors is met; wherein the factors include at least a distance between an originating point and the delivery point of the item, a previous delivery history to the delivery point, a size of the delivery point, and environmental conditions associated with inclement weather at an expected time of delivery of the item;
   an executable portion that, based on the scanning of the delivery point, determines if the delivery point is in a first condition or a second condition; and
   an executable portion that, if the delivery point is in the first condition, controls the first drone to deliver the selected item to the delivery point.

16. The computer program product of claim 15, wherein the first condition is indicative of the delivery point being in a condition suitable to receive the selected item, and the second condition is indicative of at least one of an obstruction at the delivery point or the environmental conditions at the delivery point.

17. The computer program product of claim 16, further including an executable portion that, if the delivery point is in the second condition, cancels or delays said delivery of the selected item to the delivery point.

18. The computer program product of claim 16, further including an executable portion that, if the delivery point is in the second condition, determines an alternative delivery point for the selected item.

19. The computer program product of claim 16, further including an executable portion that, if the delivery point is in the second condition, causes a message to be generated, wherein the message is indicative of the delivery point being in the second condition and includes at least one of an electronic message or an aural message.

20. The computer program product of claim 16, further including:
   an executable portion that, if the delivery point is in the second condition, and the second condition is indicative of an obstruction at the delivery point, causes the obstruction to be moved; and
   an executable portion that controls the first drone to deliver the selected item to the delivery point after said moving of the obstruction.

21. The computer program product of claim 15, wherein at least one of the first drone or the second drone is an unmanned aerial vehicle (UAV).

* * * * *